US008406564B2

(12) United States Patent
Sun et al.

(10) Patent No.: US 8,406,564 B2
(45) Date of Patent: Mar. 26, 2013

(54) REMOVING BLUR FROM AN IMAGE

(75) Inventors: Jian Sun, Beijing (CN); Heung-Yeung Shum, Beijing (CN); Lu Yuan, Hong Kong (CN); Long Quan, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 1128 days.

(21) Appl. No.: 12/237,126

(22) Filed: Sep. 24, 2008

(65) Prior Publication Data
US 2010/0074552 A1 Mar. 25, 2010

(51) Int. Cl.
G06K 9/64 (2006.01)
G06K 9/40 (2006.01)
G06K 9/36 (2006.01)

(52) U.S. Cl. ......... 382/279; 382/275; 382/266; 382/240

(58) Field of Classification Search .................. None
See application file for complete search history.

(56) References Cited

U.S. PATENT DOCUMENTS

| | | | |
|---|---|---|---|
| 5,862,269 A | 1/1999 | Cohen et al. | |
| 6,798,860 B1 | 9/2004 | Hsieh et al. | |
| 6,993,204 B1 | 1/2006 | Yahil et al. | |
| 7,139,067 B2 | 11/2006 | Pohle et al. | |
| 7,336,844 B2 | 2/2008 | Pike et al. | |
| 7,346,222 B2 | 3/2008 | Lee et al. | |
| 2007/0009169 A1 | 1/2007 | Bhattacharjya | |
| 2008/0025627 A1* | 1/2008 | Freeman et al. | 382/255 |
| 2008/0240607 A1* | 10/2008 | Sun et al. | 382/275 |

OTHER PUBLICATIONS

Bioucas-Dias, Bayesian Wavelet-Based Image Deconvolution, Apr. 2006, IEEE transaction on image processing, vol. 15 No. 4, pp. 937-951.*
Lofdahl, Mats G., "Multi-Frame Blind Deconvolution with Linear Equality Constraints", Retreived at <<http://citeseer.ist.psu.edu/cache/papers/cs/26352/http:zSzzSzwww.astro.su.sezSz~matszSzpublicationszSzoffprintszSzlofdahl02multi-frame.pdf/multi-frame-blind-deconvolution.pdf>>, Jul. 2002, Seattle , Washington, USA, pp. 1-10.
Ricort, et al., "Application of the Richardson-Lucy Algorithm to the Deconvolution of Two-Fold Probability Density Functions", Retreived at <<http://www.iop.org/EJ/article/0963-9659/2/2/005/pa930205.pdf?request-id=4d0b0749-5aa8-432f-a6e1-068ee7fe8912>>, Received Feb. 21, 1992, pp. 125-143.
Wu, et al., "Blind Deconvolution using a Monotonicity Constraint on the PSF", Retreived at <<http://ieeexplore.ieee.org/iel5/9711/30651/01415483.pdf?arnumber=1415483>>, ICSAAP 2005, pp. 629-632.
Biggs, et al., "Iterative Blind Deconvolution of Extended Objects", Retreived at <<http://ieeexplore.ieee.org/iel5/4998/13789/00638806.pdf>>, 1997 IEEE, pp. 454-457.
Yuan, et al, "Image Deblurring with Blurred/Noisy Image Pairs", Retreived at <<http://www.cs.ust.hk/~quan/publications/yuan-deblur-siggraph07.pdf>>, pp. 9.

(Continued)

Primary Examiner — Randolph I Chu
(74) Attorney, Agent, or Firm — Alleman Hall McCoy Russell & Tuttle LLP

(57) ABSTRACT

Embodiments related to the removal of blur from an image are disclosed. One disclosed embodiment provides a method of performing an iterative non-blind deconvolution of a blurred image to form an updated image. The method comprises downsampling the blurred image to form a blurred image pyramid comprising images of two or more different resolution scales, downsampling a blur kernel to form a blur kernel pyramid comprising kernels of two or more different sizes, and deconvoluting a selected image in the blurred image pyramid according to a Richardson-Lucy deconvolution process in which a bilateral range/spatial filter is employed.

19 Claims, 3 Drawing Sheets

OTHER PUBLICATIONS

Sroubek, et al., "Multiframe Blind Deconvolution Coupled with Frame Registration and Resolution Enhancement", Retrieved at <<dar.site.cas.cz/download.php?bd=394>>, pp. 9-39.

Levin, et al., "Image and Depth from a Conventional Camera with a Coded Aperture", pp. 9.

Dey, et al., "3D Microscopy Deconvolution using Richardson-Lucy Algorithm with Total Variation Regularization", INRIA 2004, pp. 74.

Durand, et al., "Fast Bilateral Filtering for the Display of High-Dynamic-Range Images", Retrieved at<<people.csail.mit.edu/fredo/PUBLI/Siggraph2002/DurandBilateral.pdf>> pp. 10.

Kopf, et al., "Joint Bilateral Upsampling", Retrieved at <<johanneskopf.de/publications/jb/index. >>, pp. 5.

Eisemann, et al., "Flash Photography Enhancement via Intrinsic Relighting", Retrieved at<<s.imag.fr/Publications/2004/ED04/>>, pp. 6.

Petschnigg, et al., "Digital Photography with Flash and No-Flash Image Pairs", pp. 9.

Tomasi, et al., "Bilateral Filtering for Gray and Color Images", Proceedings of the 1998 IEEE International Conference on Computer Vision, Bombay India, pp. 8.

Lucy, L. B., "An Iterative Technique for the Rectification of Observed Distribution", The Astronomical Journal vol. 79, No. 6, Jun. 1974, pp. 745-754.

Murtagh, et al., "Image Restoration With Noise Suppression Using a Multiresolution Support", pp. 15.

* cited by examiner

REMOVING BLUR FROM AN IMAGE

BACKGROUND

Image deconvolution is a process that attempts to reconstruct a true image from a degraded image, where the blurred image is a convolution of the true image and a blur kernel that may be spatially variant or invariant. Mathematically, a blurred image may be expressed as B=noise(I⊗K), where I is the true image, K is the blur kernel, "noise" is a noise process, and B is the blurred image. A deconvolution process may be referred to as "non-blind deconvolution" where the blur kernel is known. On the other hand, where the blur kernel is not known, the deconvolution process may be referred to as "blind deconvolution."

Image deconvolution finds utility in many different fields. For example, deconvolution may be used in scientific fields, such as astronomical and medical imaging, as well as in consumer electronics, such as digital cameras. For example, in consumer photography, image blurring may be difficult to avoid due to insufficient lighting, use of telephoto lenses, use of a small aperture for a wide depth of field, etc. Deconvolution may allow removal of blur from such images, and therefore produce a clearer image for viewing, printing, etc.

However, a deconvoluted image may contain unpleasant artifacts due to the ill-posedness of the deconvolution process, even if the kernel is known. Because the kernel may be bandlimited with a sharp frequency cutoff, there may be zero or near-zero values in its frequency response. At those frequencies the inverse of the kernel may have a very large magnitude, thereby causing excessive amplification of signal and noise. Two of the most prevalent resulting artifacts are ripple-like ringing around edges (i.e. transition regions) in the image, and amplified noise. Ringing artifacts are periodic overshoots and undershoots around an edge, which decay spatially away from the edge. It may be difficult to remove such artifacts after performing a deconvolution.

SUMMARY

Accordingly, various embodiments are presented herein that relate to the removal of blur from an image. For example, one disclosed embodiment provides a method of performing an iterative non-blind deconvolution of a blurred image to form an updated image. The method comprises downsampling the blurred image to form a blurred image pyramid comprising images of two or more different resolution scales, downsampling a blur kernel to form a blur kernel pyramid comprising kernels of two or more different sizes, and deconvoluting a selected image in the blurred image pyramid according to a Richardson-Lucy deconvolution process in which a bilateral range/spatial filter is employed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
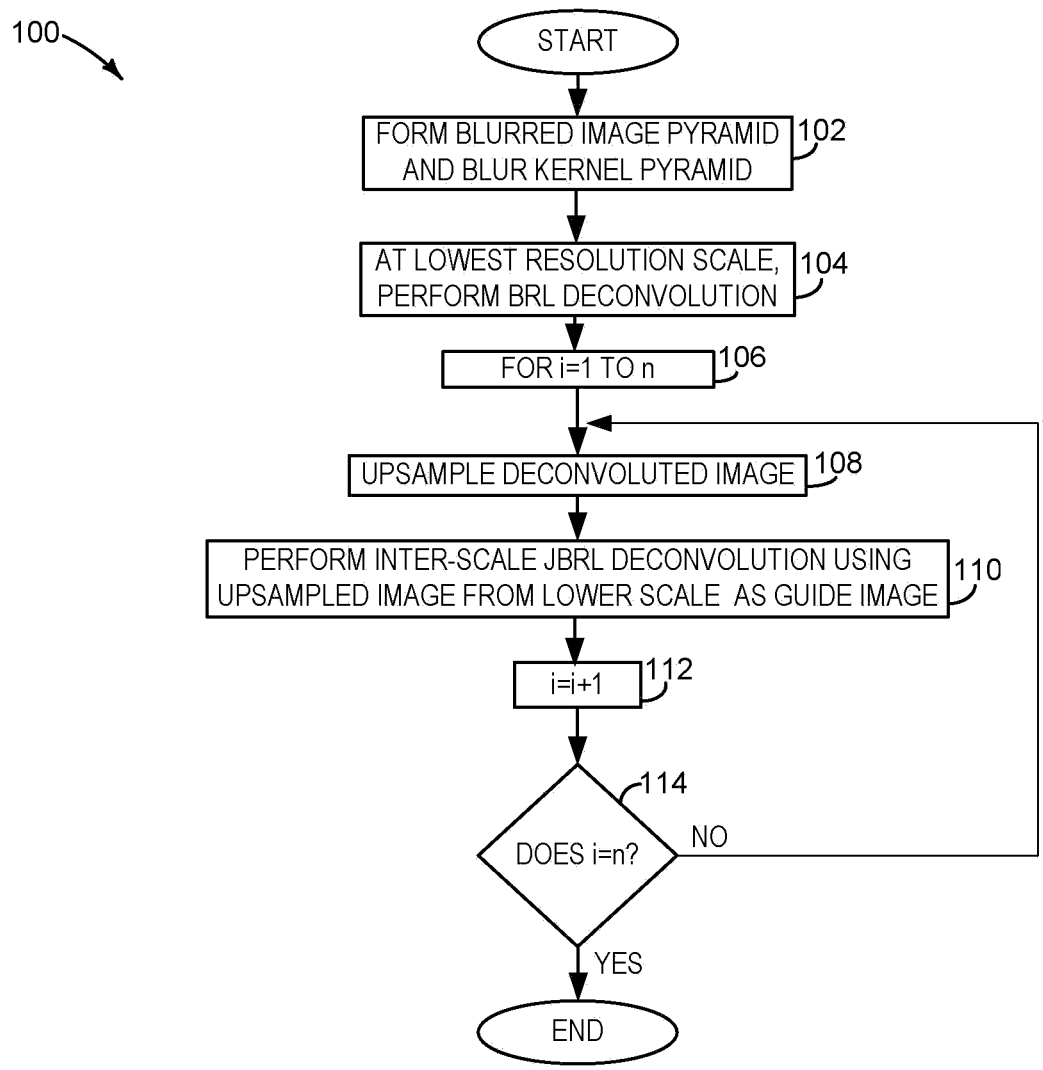
FIG. 1 shows a flow diagram depicting an embodiment of a method for deconvoluting an image.

Embodiments are disclosed herein that relate to the deconvolution of an image in such a manner as to reduce ringing and other artifacts that arise from other deconvolution processes. The disclosed embodiments utilize novel modifications of the Richardson-Lucy (RL) deconvolution approach to iteratively recover detail in blurred transition regions of an image. Prior to discussing the iterative recovery of detail in an image, the RL and modified RL deconvolution approaches are described.

The RL deconvolution approach involves determining a likelihood probability of an image I for a Poisson noise distribution. The likelihood probability of the image I may be expressed as:

$$p(B\mid I) = \prod_x \frac{(I\otimes K)(x)^{B(x)} \exp\{-(I\otimes K)(x)\}}{B(x)!}, \qquad (1)$$

where B(x)=Poisson((I⊗K)(x)) is a Poisson process for each pixel x. For simplicity, the x is omitted from the following equations. The maximum likelihood solution of I may be obtained by minimizing the following energy:

$$I^* = \mathrm{argmin}_I E(I), \qquad (2)$$

where $$E(I) = \sum \{(I\otimes K) - B\cdot\log[(I\otimes K)]\}. \qquad (3)$$

Taking the derivative of E(I) and assuming the normalized kernel K (∫K(x)dx=1), the RL approach iteratively updates an image according to the following relationship:

$$I^{t+1} = I^t\left[K^* \otimes \frac{B}{(I^t\otimes K)}\right], \qquad (4)$$

where K* is the adjoint of K, i.e. K*(i,j)=K(−j,−i), and t is a time step. The RL approach has the properties of non-negativity and energy preservation. The non-negativity constrains estimated values be negative, and the approach preserves a total energy of an image each iteration.

However, the RL algorithm may not preserve edges during deconvolution, and may introduce ringing and other such artifacts. Therefore, the embodiments described herein introduce an edge preservation regularization term into the energy minimization equation described above, as follows:

$$I^* = \mathrm{argmin}_I[E(I) + \lambda(E_B(I)]. \qquad (5)$$

In this relationship, λ is a regularization factor described in more detail below. The term $E_B(I)$ may be defined as follows:

$$E_B(I) = \sum_x \sum_{y \in \Omega} f(|x-y|)\rho(|I(x) - I(y)|), \quad (6)$$

where f is a spatial filter, ρ is a robust penalty function, and Ω is a spatial support centered at each pixel x. The spatial filter may be a Gaussian, as follows:

$$f(|x-y|) = \exp\left(-\frac{|x-y|^2}{2\sigma_s}\right), \quad (7)$$

where $\sigma_s$ is a spatial variance. The spatial support Ω centered at each pixel x controls an amount of neighboring pixels involved, and may have any suitable value. For example, in one embodiment, the radius of spatial support $r_\Omega$ may be set with reference to a size of the blur kernel K: $r_\Omega = 0.5\, r_K$, where $r_K$ is a radius of the blur kernel. The spatial variance $\sigma_s$ may be derived from the radius of spatial support, as follows:

$$\sigma_s = (r_\Omega/3)^2 \quad (8)$$

The robust penalty function ρ(•) may be defined in any suitable manner. In one embodiment, the robust penalty function may take the following form:

$$\rho(|I(x) - I(y)|) = 1 - \exp\left(-\frac{|I(x) - I(y)|^2}{2\sigma_r}\right), \quad (9)$$

wherein $\sigma_r$ represents a range variance. Such a robust penalty function may give a large but limited penalty on the image difference |I(x)−I(y)| for the range variance $\sigma_r$. The range variance may have any suitable value or form. In one embodiment, the range variance is adaptively set to 0.01× |max(I)−min(I)|².

By minimizing relationship (5) above, the following iterative updating approach is produced:

$$I^{t+1} = \frac{I^t}{1 + \lambda \nabla E_B(I^t)} \left[ K^* \otimes \frac{B}{I^t \otimes K} \right]. \quad (10)$$

The derivative $\nabla E_B(I)$ may be determined in any suitable manner. In one embodiment, this derivative is determined in the following manner:

$$\nabla E_B(I) = \sum_{y \in \Omega} (I_y^d - I_y^d D_y), \quad (11)$$

where $D_y$ is a displacement matrix operator that shifts the image $I_y^d$ by $|\vec{e}|$ pixels in a direction of $\vec{e}$. Here, $\vec{e}$ denotes a displacement vector from each pixel x to its neighbor pixel y. $I_y^d$ is a weighted long-range gradient image in the direction of $\vec{e}$. For each pixel x in the image $I_y^d$, $$I_y^d(x) = f(|x-y|)g(|I(x) - I(y)|) \cdot \frac{(I(x) - I(y))}{\sigma_r}, \quad (12)$$

where the range filter $$g(|I(x) - I(y)|) = 1 - \rho(|I(x) - I(y)|) = \exp\left(-\frac{|I(x) - I(y)|^2}{2\sigma_r}\right)$$

is a Gaussian filter. The weight for the difference |I(x)−I(y)| is determined by a bilaterally weighted filter f(•)g(•) in space and range, which may be referred to as a bilateral filter, as described in Tomasi, C., and Manduchi, R. 1998, *Bilateral filtering for gray and color images*, In proceedings of ICCV, 839-847; and in Durand, F., and Dorsey, J. 2002, *Fast bilateral filtering for the display of high-dynamic-range images*, in Proceedings of SIGGRAPPH, 257-266.

In the embodiment described above, the gradient image $I_y^d$ controls the regularization of each pixel. Without the bilateral filter, $I_y^d$ may place a large penalty on large image gradients, which may lead to a smoothing of sharp edges. However, the use of the bilateral filter preserves sharp edges, as it takes on smaller values as the spatial distance and/or the range distance increase. A Richardson-Lucy deconvolution that utilizes such a bilateral range/spatial filter may be referred to herein as a BRL (bilateral Richardson-Lucy) deconvolution.

The above-disclosed BRL deconvolution may adaptively use information in a relatively large spatial support, for example, 11×11, with good results. However, larger blur kernels may still pose challenges. Therefore, a BRL deconvolution may be further adapted to allow the deconvolution to utilize a larger spatial support, such as a 40×40 spatial support, via the use of a progressive deconvolution approach that utilizes an external guide image to guide an image deconvolution.

A progressive deconvolution utilizing a guide image may be performed on an inter-scale and/or an intra-scale basis, where the term "scale" herein refers to a resolution of an image in the blurred image pyramid. In an inter-scale process, a blurred image is first downsampled progressively to build a pyramid of two or more different images of different scales. Then, each layer of the pyramid is deconvoluted, from the lower resolution scales to the higher resolution scales, to iteratively remove blur from the image. In this process, a guide image from a lower resolution scale is used to guide the deconvolution at a higher scale to assist in edge preservation. In an intra-scale process, an image in a single scale is iteratively deconvoluted to recover additional details at that scale.

It will be appreciated that the intra-scale and inter-scale deconvolutions may be performed either separately, or together in an integrated process. Further, it will be appreciated that the disclosed embodiments may be implemented via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to personal computers, servers, clients, laptop computers, hand-held devices, cellular phones, media players, digital cameras, microprocessor-based programmable consumer electronics and/or appliances, and other such devices.

Turning now to the Figures, FIG. 1 shows an embodiment of an inter-scale deconvolution process 100. Process 100 comprises, at 102, forming a blurred image pyramid $\{B^l\}_{l=1}^{L}$ of a full-resolution blurred image, and also forming a blur kernel pyramid $\{K^l\}_{l=1}^{L}$ of the blur kernel K. A "blurred image pyramid" as contemplated may be formed, for example, by iteratively downsampling an initial blurred image B to form downsampled images of a plurality of different resolution scales. Any suitable downsampling process may be used. In one embodiment, bicubic downsampling is utilized with a scale factor of $\sqrt{2}$.

The inter-scale deconvolution embodiment described herein progressively recovers an image pyramid $\{I^l\}_{l=1}^{L}$ from coarse scale to fine scale. Therefore, process 100 comprises, at 104, performing a deconvolution process at the lowest resolution scale in the blurred image pyramid. At this resolution scale, which may be referred to as scale 0, the blur kernel K may be small enough to perform a BLR deconvolution process with effective ringing suppression.

Next, an iterative upsampling and deconvolution process is performed. The iterative nature of this process is indicated in FIG. 1 via a counter initialization step 106. In this iterative process, the image deconvoluted at the lowest resolution scale 0 is upsampled, as indicated at 108, to be equal in resolution to the next image scale (i=1) in the blurred image pyramid. Then, the blurred image at scale i=1 is deconvoluted utilizing the upsampled image from scale 0 as a guide image, as indicated at 110.

The use of a guide image in the deconvolution of scales 1 through n may help to recover edges while suppressing ripple effects and other artifacts that may arise from deconvolution. The guide image may be used to guide an inter-scale deconvolution in any manner. For example, in one embodiment, the guide image is utilized as an additional filter in a BRL deconvolution. A BRL deconvolution that utilizes a guide image as a filter may be referred to herein as a joint bilateral Richardson-Lucy (JBRL) deconvolution.

One embodiment of a JBRL deconvolution process is as follows, where the upsampled guide image from a lower resolution scale is given by $I^g$. The energy minimization equation shown above at (5) may be modified to introduce the guide image by defining a joint term $E_{JB}(I;I^g)$ that takes both the image and the guide image into account, as follows:

$$E_{JB}(I;I^g) = \sum_x \sum_{y \in \Omega} f(|x-y|)g'(|I^g(x)-I^g(y)|)\rho(|(I(x)-I(y)|), \quad (13)$$

where $g'(|I^g(x)-I^g(y)|)$ is a range filter applied on the guide image $I^g$. Any suitable filter may be used as the range filter. In one embodiment, a Gaussian filter may be used as a range filter, as follows:

$$g'(|I^g(x)-I^g(y)|) = \exp\left(-\frac{|I^g(x)-I^g(y)|^2}{2\sigma_r^g}\right), \quad (14)$$

where $\sigma_r^g$ is a range variance. The range variance may have any suitable value. For example, in one embodiment, the range variance is adaptively set to $0.01 \times |\max(I^g)-\min(I^g)|^2$. To reconstruct an image, the following energy may be minimized:

$$I^* = \underset{I}{\operatorname{argmin}}[E(I) + \lambda E_{JB}(I;I^g)]. \quad (15)$$

The minimization of this energy relationship yields the same iterative updating equation as for the BRL deconvolution described above in equation (10), with the exception that equation (12) becomes:

$$I_y^d(x) = f(|x-y|)g(|I(x)-I(y)|) \cdot g'(|I^g(x)-I^g(y)|) \cdot \frac{(I(x)-I(y))}{\sigma_r}. \quad (16)$$

The additional range filter $g'(|I^g(x)-I^g(y)|)$ decreases the regularization at places where the image gradient $|I^g(x)-I^g(y)|$ is large in the guide image. Thus, the regularization is guided both by an "internal force" $g(|I(x)-I(y)|)$ and an "external force" $g'(|I^g(x)-I^g(y)|)$. In this manner, the guide image helps to control the regularization strength in areas of high image gradient (i.e. transitions) by utilizing a previously deconvoluted guide image from a lower resolution scale. Because the guide image has been previously deconvoluted, the guide image may provide more useful edge information than the original blurred image at that image scale for reducing the regularization strength at edges in the image.

Referring briefly back to process 108, a deconvoluted image at a scale i in the blurred image pyramid may be upsampled in any suitable manner to form a guide image for scale i+1. For example, in some embodiments, a simple bilinear or bicubic interpolation schema may be employed. However, these upscaling methods may tend to smooth the image edges. Therefore, in other embodiments, a BRL approach may be employed to preserve edge information in the upscaling process. An example embodiment of such an upscaling process may be performed as follows. First, it is assumed that a bicubic upsampled image $I^u$ is a degraded version of an intended higher resolution image $I^h$. The degradation may be approximated by a small Guassian blur kernel k. Therefore, $I^u$ may be expressed as $I^u = I^h \otimes k$, with a standard deviation of 0.5 for an upsampling factor of $\sqrt{2}$. This approximation has been found to produce an upsamped image with sharp edges suitable for use as a guide image.

Continuing with FIG. 1, after performing the JBRL inter-scale deconvolution, the process is repeated for the next scale. This is shown in FIG. 1 schematically by increasing the counter variable i by one at 112, and then returning to the upsampling process at 108. In this manner, the deconvolution continues iteratively until all i resolution scales have been deconvoluted, as indicated at 114, thereby producing a restored image with blur removed.

Figure 2:
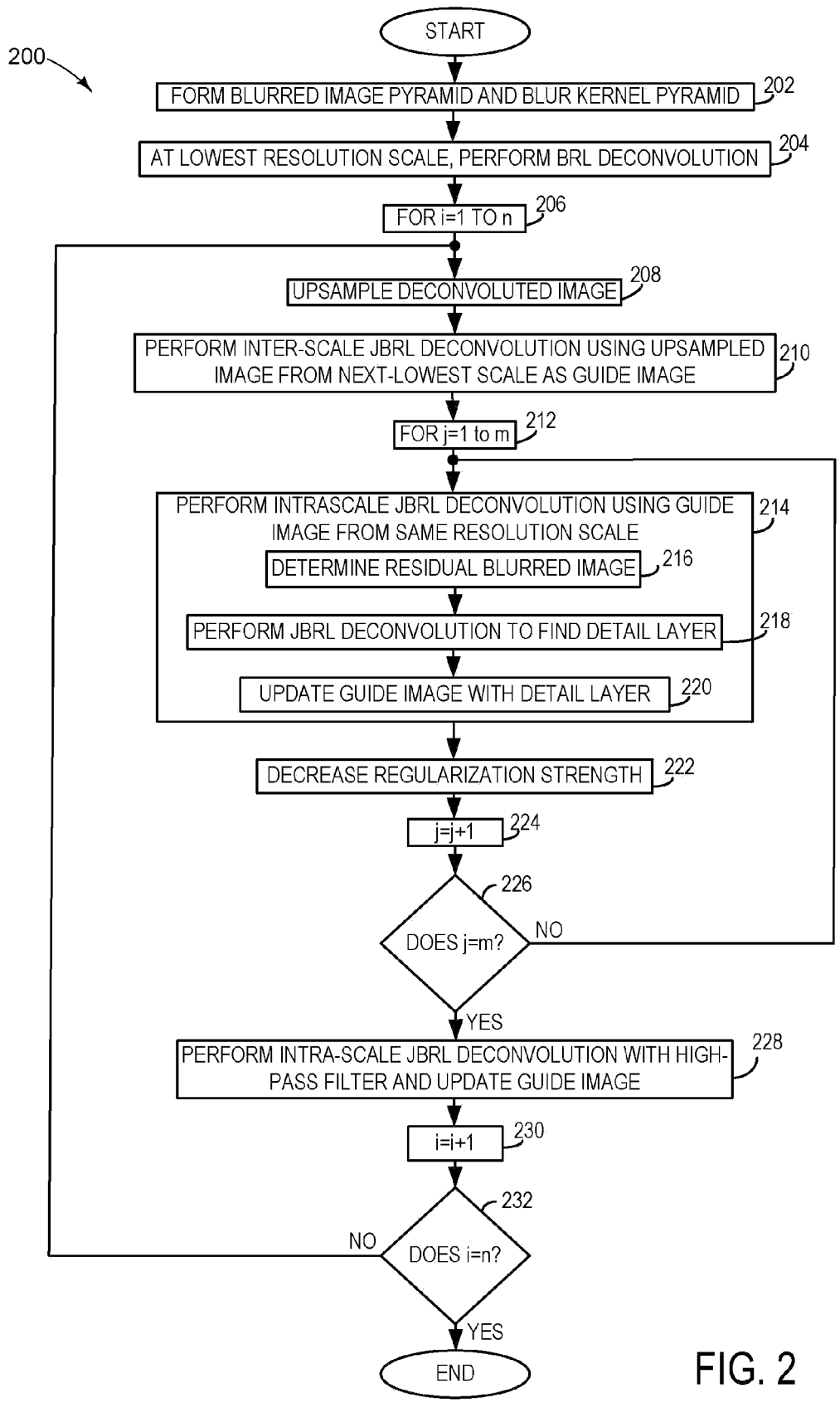
FIG. 2 shows a flow diagram depicting another embodiment of a method for deconvoluting an image.

As mentioned above, in some embodiments, both intra-scale and inter-scale deconvolutions may be performed. FIG. 2 shows an example of a process 200 for deconvoluting an image that utilizes both intra-scale and inter-scale deconvolution processes. Method 200 starts in a similar manner as method 100, in that a blurred image pyramid and a kernel pyramid are formed at 202, and a BRL deconvolution (as opposed to a JBRL deconvolution) is performed at scale zero (i=0), as indicated at 204. Next, an iterative inter-scale deconvolution process is entered, as indicated by a counter variable initialization shown at 206. Method 200 then comprises, at 208, upsampling the zero scale image to scale i=1 to form a guide image, and performing a JBRL deconvolution process utilizing the upsampled guide image as described above for FIG. 1.

Method 200 next enters an iterative intra-scale deconvolution process, as shown at 212 by the initialization of an intra-scale counter variable m. The use of an intra-scale deconvolution process may allow additional details to be recovered in an image while still suppressing ringing artifacts. For example, inter-scale deconvolution may utilize a relatively large regularization strength λ to effectively suppress ringing in smooth regions, as the magnitude of ringing artifacts may be proportional to the amplitude of the gradient at edges in the image. However, large regularization strengths may also suppress the recovery of details. Therefore, an iterative intra-scale deconvolution may be used to recover image details by decreasing a regularization strength for each successive iteration.

Referring again to FIG. 2, the iterative intra-scale deconvolution process first comprises performing, at 214, a JBRL deconvolution using a guide image from the same resolution scale. In the embodiment of FIG. 2, this comprises first determining, at 216, a blurred residual image $\Delta B = B - I^g \otimes K$. Then, at 218, a JBRL deconvolution process is used to recover a detail layer $\Delta I$ from the blurring equation $\Delta B = \Delta I \otimes K$. The guide image $I^g$ upsampled from a next-lower resolution layer is used as the guide image in the first iteration, and is then updated at 220 with the recovered detail layer to form a new guide image for a next intra-scale JBRL iteration.

Before performing the next intra-scale deconvolution iteration, the regularization strength λ is reduced at 222. Then, at 224 and 226, method 200 loops back to 214 to perform another intra-scale deconvolution process. This reduces an amount of smoothing caused by the deconvolution process, and therefore may allow the recovery of more edge detail. The regularization strength may be reduced by any suitable amount. An amount of the reduction may depend upon a number of intra-scale deconvolution iterations to be performed. For example, in one embodiment, three deconvolutions are performed at each resolution scale other than scale zero, and the regularization strength is reduced by a factor ⅓ between each regularization. Thus, the first deconvolution is performed at full regularization strength (λ), the second at ⅓ strength (λ/3), and the third at ⅑ strength (λ/9). In this manner, each iteration recovers finer and finer detail that is added to the deconvoluted image at that scale.

Depending upon the value of the regularization strength λ at the final intra-scale deconvolution for each resolution scale, the regularization strength may be so low that some ringing is not suppressed. However, the frequencies at which most noticeable ringing artifacts occur may be lower than the frequencies of the details that are recovered in this final iteration. Furthermore, human perception may tolerate small scale ringing in highly textured regions. In light of these factors, a high pass filter may be used during a last iteration of the intra-scale deconvolution, as indicated at 228, to enforce a smoothness constraint on a middle range of frequencies of the recovered details, as follows:

$$I^* = \underset{I}{\mathrm{argmin}}[E(I) + \lambda E_J(I; I^g) + \beta E_H(\Delta I)], \quad (17)$$

where β is a scale parameter that may have any suitable value depending upon a desired strength for the $E_H(\Delta I)$ term. In one embodiment, the scale parameter β has a value of 0.4λ. The term $E_H(\Delta I)$ is the sum of the filtered image $\Delta I \otimes G$, as follows:

$$E_H(\Delta I) = \sum_x \Delta I \otimes G. \quad (18)$$

Here, G is a Gaussian kernel with a variance $\sigma_h = \sigma_s$. The effect of equations (17) and (18) is to perform high-pass filtering by adding a mid-scale regularization term to suppress midscale ringing artifacts while still allowing the recovery of fine details.

Continuing with FIG. 2, after performing the intra-scale deconvolution with the high pass filter at 228, method 200 iteratively loops back to step 208, as indicated at 230 and 232, where the final image from the current resolution scale is upsampled to serve as a guide image for the next-higher resolution scale. In this manner, method 200 performs both inter-scale and intra-scale deconvolutions through the entire blurred image pyramid.

Figure 3:
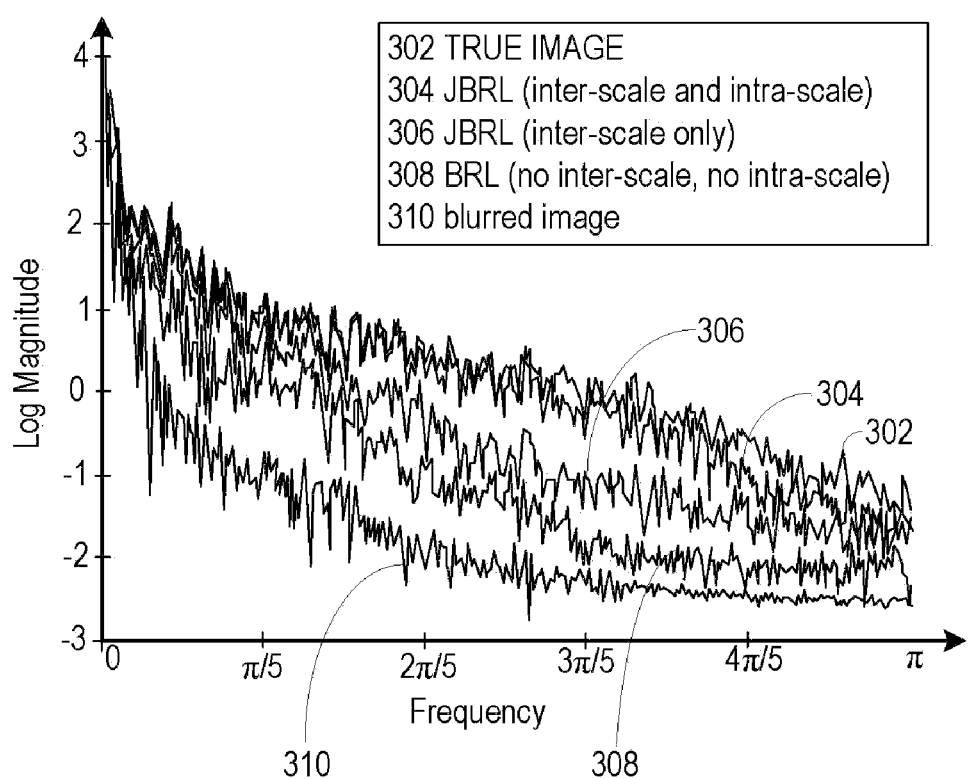
FIG. 3 shows a graph depicting a one dimensional discrete Fourier transform of a line of data taken from a true version of an image, a blurred version of the image, and three deconvoluted versions of the image.

FIG. 3 shows a graph 300 depicting the results of a one-dimensional discrete Fourier transform performed on a scanline (262th row) of a true image compared to processed versions of the image. Specifically, FIG. 3 shows the frequency profile of a true image at 302, an image processed by combined inter-scale and intra-scale JBRL (following method 200 of FIG. 2) at 304, an image processed by inter-scale JBRL (following method 100 of FIG. 1) at 306, an image processed by BRL without the use of a guide image at 308, and of a blurred image at 310.

In FIG. 3, it can be seen that all three approaches facilitate the recovery of high frequency information in the blurred image. Further, it can be seen that the JBRL methods allow the recovery of more high frequency information than BRL alone. Finally, it can be seen that the combination of intra-scale and inter-scale JBRL deconvolution may allow the recovery of more high frequency information than the use of inter-scale JBRL alone.

Figure 4:
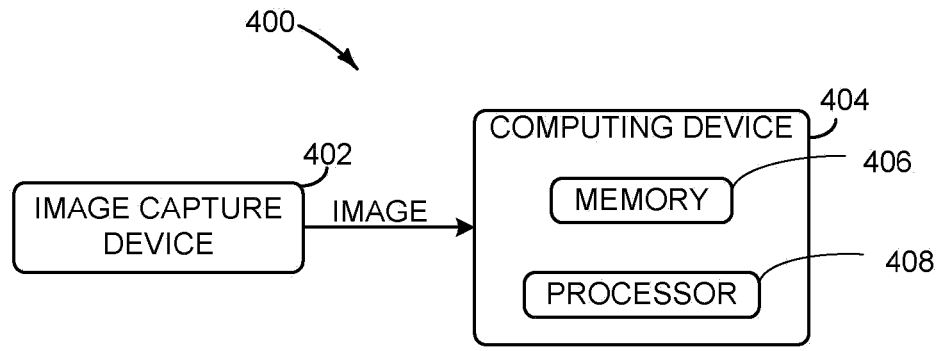
FIG. 4 shows a block diagram of an embodiment of a system for acquiring and deconvoluting an image.

FIG. 4 shows an embodiment of a system 400 for capturing an image, and then deconvoluting the captured image. The system 400 comprises an image capture device 402, and a computing device 404 with memory 406 and a processor 408. The memory 406 may contain instructions stored thereon that are executable by the processor 408 to de-blur an image via a BRL and/or JBRL deconvolution process, as described above. In some embodiments, the image capture device 402 and computing device 404 may be located in a single device, such as in a digital camera. In other embodiments, the computing device 404 may be separate from the image capture device 402. For example, the computing device 404 may be a personal computer with photographic processing software configured to de-blur an image in the manner disclosed herein. Where the image capture device 402 and the computing device 404 are separate, images may be transferred from the image capture device 402 to the computing device 404 in any suitable manner, including but not limited to via a direct cable or wireless connection, over a network connection, via a portable memory device, etc.

While the BRL and JBRL processes disclosed herein are described in the context of specific example embodiments, it will be appreciated that the configurations and/or approaches described herein are exemplary in nature, and that these specific embodiments or examples are not to be considered in a limiting sense, because numerous variations are possible. The specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer-readable memory comprising instructions thereon that are executable by a computing device to perform an iterative non-blind deconvolution of a blurred image to form an updated image, the deconvolution comprising:
   downsampling the blurred image to form a blurred image pyramid comprising images of two or more different resolution scales;
   downsampling a blur kernel to form a blur kernel pyramid comprising kernels of two or more different sizes; and
   deconvoluting a selected image in the blurred image pyramid according to a bilateral Richardson-Lucy deconvolution process including a bilateral range/spatial filter and an additional range filter reliant on an external guide image.

2. The computer-readable memory of claim 1, wherein the guide image is an upsampled image from a previously deconvoluted next-lower resolution scale in the blurred image pyramid.

3. The computer-readable memory of claim 1, wherein the guide image is a previously updated image from a same resolution scale in the blurred image pyramid as a current image.

4. The computer-readable memory of claim 1, wherein the instructions are executable to perform one or more inter-scale deconvolutions in which the guide image at a selected scale in the blurred image pyramid is an upsampled image from a next-lower scale in the blurred image pyramid.

5. The computer-readable memory of claim 4, wherein the instructions are executable to perform one or more intra-scale deconvolutions in which the guide image is a previously deconvoluted image from a same scale in the blurred image pyramid.

6. The computer-readable memory of claim 5, wherein the instructions are executable to perform the bilateral Richardson-Lucy deconvolution process in which the bilateral range/spatial filter is employed and in which the spatial filter reliant on the guide image is employed as follows:

$$I^{t+1} = \frac{I^t}{1 + \lambda \nabla E_B(I^t)} \left[ K^* \otimes \frac{B}{(I^t \otimes K)} \right]$$

wherein $I^{t+1}$ is a value of a pixel in the updated image, $I^t$ is a value of the pixel in a current image, B is a value of the pixel in the original degraded image, K is a blur kernel, $K^*$ is an adjoint of K, $\lambda$ is a regularization strength, and $\nabla E_B$ comprises the bilateral range/spatial filter and the spatial filter reliant on the guide image; and
   wherein the regularization strength $\lambda$ is reduced after each intra-scale deconvolution process within an image scale.

7. The computer-readable memory of claim 6, wherein $\nabla E_B$ comprises a high pass filter as an additional filter for the bilateral Richardson-Lucy deconvolution process in a final intra-scale deconvolution at each scale in the blurred image pyramid.

8. A method of deconvoluting a blurred image via a non-blind deconvolution, the method comprising:
   iteratively downsampling the blurred image to form a blurred image pyramid comprising images of a plurality of different resolution scales;
   at a lower resolution scale in the blurred image pyramid, deconvoluting a lower resolution image according to a Joint Bilateral Richardson-Lucy (JBRL) deconvolution process in which a bilateral range/spatial filter is employed and in which an additional range filter reliant on a guide image upsampled from a next-lowest resolution scale is also employed;
   upsampling the lower resolution image to form an upsampled image; and
   at a higher resolution scale in the blurred image pyramid, deconvoluting the higher resolution image according to the JBRL deconvolution process in which the upsampled image is utilized as the guide image for the additional range filter.

9. The method of claim 8, further performing a Bilateral Richardson-Lucy (BRL) deconvolution process at a lowest resolution scale in the blurred image pyramid in which the spatial filter employing the guide image is not used.

10. The method of claim 8, further comprising performing one or more intra-scale deconvolutions in one or more resolution scales, in which the guide image is a previously deconvoluted image from a same scale in the blurred image pyramid.

11. The method of claim 10, further comprising reducing a regularization strength after each intra-scale deconvolution within an image scale.

12. The method of claim 8, wherein the JBRL deconvolution process proceeds as following:

$$I^{t+1} = \frac{I^t}{1 + \lambda \nabla E_B(I^t)} \left[ K^* \otimes \frac{B}{(I^t \otimes K)} \right]$$

wherein $I^{t+1}$ is a value of a pixel in the updated image, $I^t$ is a value of the pixel in a current image, B is a value of the pixel in the original degraded image, K is a blur kernel, $K^*$ is an adjoint of K, $\lambda$ is a regularization strength, and $\lambda E_B$ comprises the bilateral range/spatial filter and the spatial filter reliant on the guide image.

13. The method of claim 12, wherein $\nabla E_B$ comprises a high pass filter as an additional filter for the JBRL deconvolution process in a final intra-scale deconvolution at each scale in the blurred image pyramid.

14. A method of deconvoluting an original blurred image to form an updated image, the method comprising:
   iteratively downsampling the original blurred image to form a blurred image pyramid comprising i layers of blurred images of progressively lower resolution scales, wherein i=0 is a lowest-resolution scale;
   for each resolution scale 1 to i:
      performing an inter-scale Joint Bilateral Richardson-Lucy (JBRL) deconvolution process in which a bilateral range/spatial filter is employed and in which an additional range filter reliant on a guide image upsampled from a next-lower resolution scale in the blurred image pyramid is employed;
      performing one or more intra-scale JBRL deconvolution processes in which the bilateral range/spatial filter is employed and in which a spatial filter reliant on an intra-scale guide image is employed, thereby forming an intra-scale deconvoluted image; and
   upsampling the intra-scale deconvoluted image to form a guide image for another inter-scale Richardson-Lucy deconvolution process at a next-highest scale in the blurred image pyramid.

15. The method of claim 14, further comprising, for scale zero, deconvoluting a lowest resolution image in the blurred image pyramid according to a Bilateral Richardson-Lucy (BRL) deconvolution process in which a bilateral range/spatial filter, but no spatial filter reliant on a guide image, is employed.

16. The method of claim 14, wherein upsampling the intra-scale deconvoluted image comprises performing a bicubic or bilinear interpolation to form an intermediate upscaled image, and then performing a deconvolution of the intermediate upscaled image via a Bilateral Richardson-Lucy (BRL) deconvolution process in which a bilateral range/spatial filter, but no spatial filter reliant on a guide image, is employed.

17. The method of claim 14, wherein performing one or more intra-scale JBRL deconvolution processes comprises determining a blurred residual image by $$\Delta B = B - I^g \otimes K,$$

wherein $\Delta B$ is a value of a pixel in the blurred residual image, B is a value of a pixel of the original blurred image, $I^g$ is a value of a pixel in the intra-scale guide image, and K is a blur kernel, then determining a detail layer $\Delta I$ by $$\Delta B = \Delta I \otimes K,$$

and then updating $I^g$ with the values in the detail layer $\Delta I$ to produce a guide image for a next intra-scale deconvolution process.

18. The method of claim 17, further comprising reducing a regularization strength in the next intra-scale deconvolution process.

19. The method of claim 14, further comprising employing high pass filter as an additional filter for the intra-scale JBRL deconvolution process in a final intra-scale deconvolution at each scale in the blurred image pyramid.

* * * * *